（12）United States Patent
Buonomo et al.

(10) Patent No.: US 9,674,685 B2
(45) Date of Patent: *Jun. 6, 2017

(54) DATA TOLL SUBSIDY MANAGEMENT

(71) Applicant: Verizon Patent and Licensing Inc., Arlington, VA (US)

(72) Inventors: Michael Buonomo, Acton, MA (US); Evgenia Jane Florins, Arlington, MA (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/953,552

(22) Filed: Nov. 30, 2015

(65) Prior Publication Data

US 2016/0080923 A1    Mar. 17, 2016

Related U.S. Application Data

(63) Continuation of application No. 13/934,324, filed on Jul. 3, 2013, now Pat. No. 9,204,278.

(51) Int. Cl.
*H04M 11/00*    (2006.01)
*H04W 4/24*    (2009.01)
*H04L 12/14*    (2006.01)
*H04M 15/08*    (2006.01)
*H04M 15/00*    (2006.01)

(52) U.S. Cl.
CPC ........... *H04W 4/24* (2013.01); *H04L 12/1496* (2013.01); *H04M 15/08* (2013.01); *H04M 15/09* (2013.01); *H04M 15/8083* (2013.01); *H04M 15/8214* (2013.01); *H04M 15/83* (2013.01); *H04M 15/846* (2013.01); *H04M 15/851* (2013.01)

(58) Field of Classification Search
CPC ..... H04L 12/496; H04M 15/08; H04M 15/09; H04M 15/8083; H04M 15/8214; H04M 15/83; H04M 15/846; H04M 15/851; H04W 4/24
USPC ....................................... 455/406
See application file for complete search history.

(56) References Cited

U.S. PATENT DOCUMENTS 6,181,690 B1    1/2001    Civanlar
2012/0155380 A1    6/2012    Hodges
2012/0209753 A1    8/2012    Hodges

FOREIGN PATENT DOCUMENTS

WO    2014/207550    12/2014

*Primary Examiner* — Timothy Pham

(57) ABSTRACT

A method includes receiving, from a user device associated with an end user, a request for content provided by a content provider. The method includes determining whether the requested content is to be provided on a data toll network, determining whether the requested content includes data toll free content in response to a determination that the requested content is to be provided on the data toll network, and applying graphic elements indicating data toll free status of data toll free sections of the requested content in response to a determination that the requested content includes data toll free content. The method further includes providing the requested content including the applied graphic elements to the user device, and billing data usage associated with providing the data toll free sections to the end user device to the content provider.

20 Claims, 11 Drawing Sheets

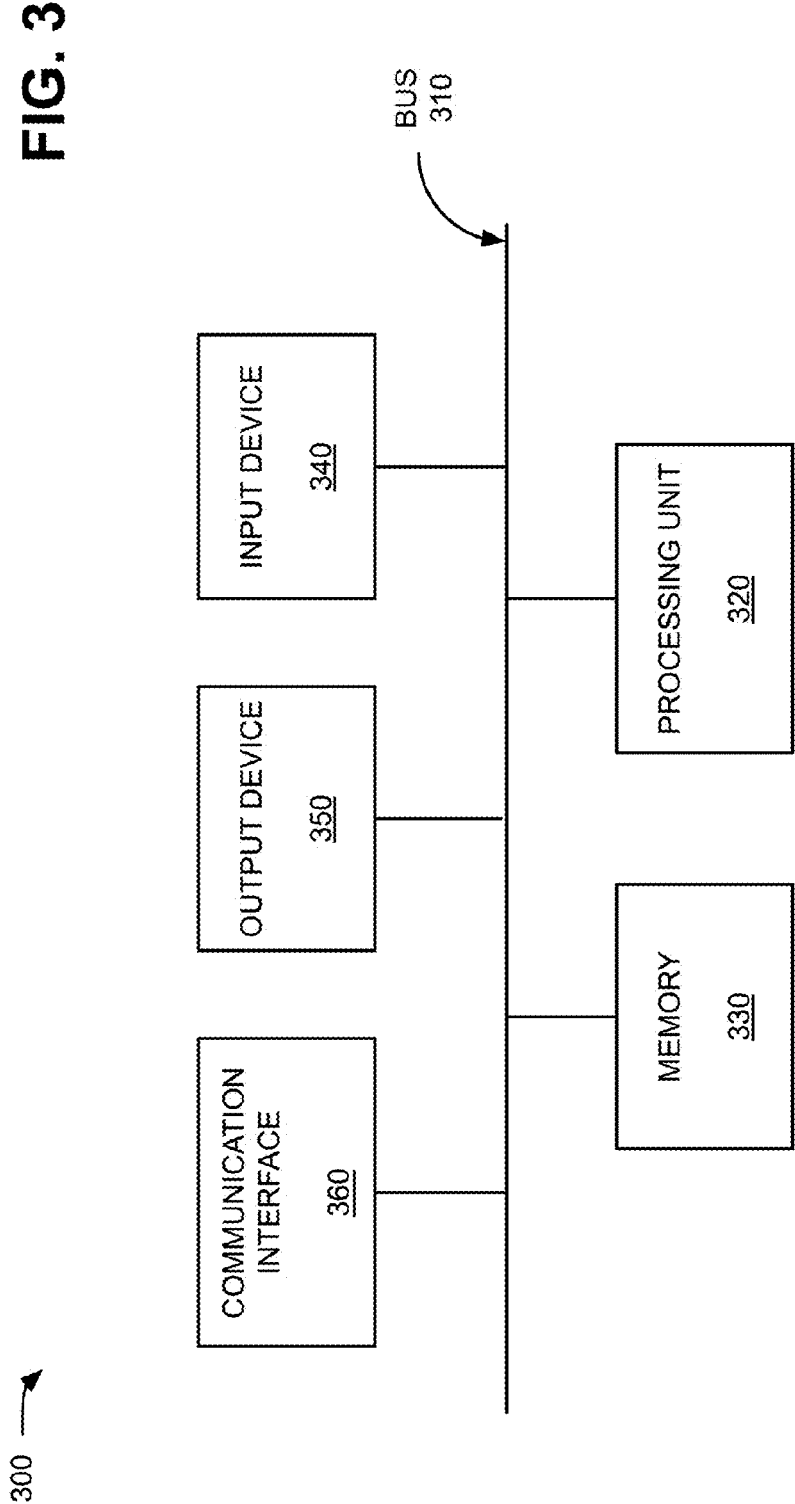

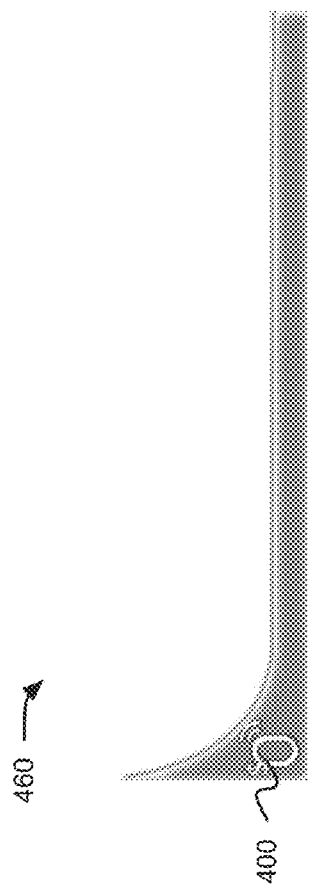
FIG. 4A
FIG. 4B
FIG. 4C

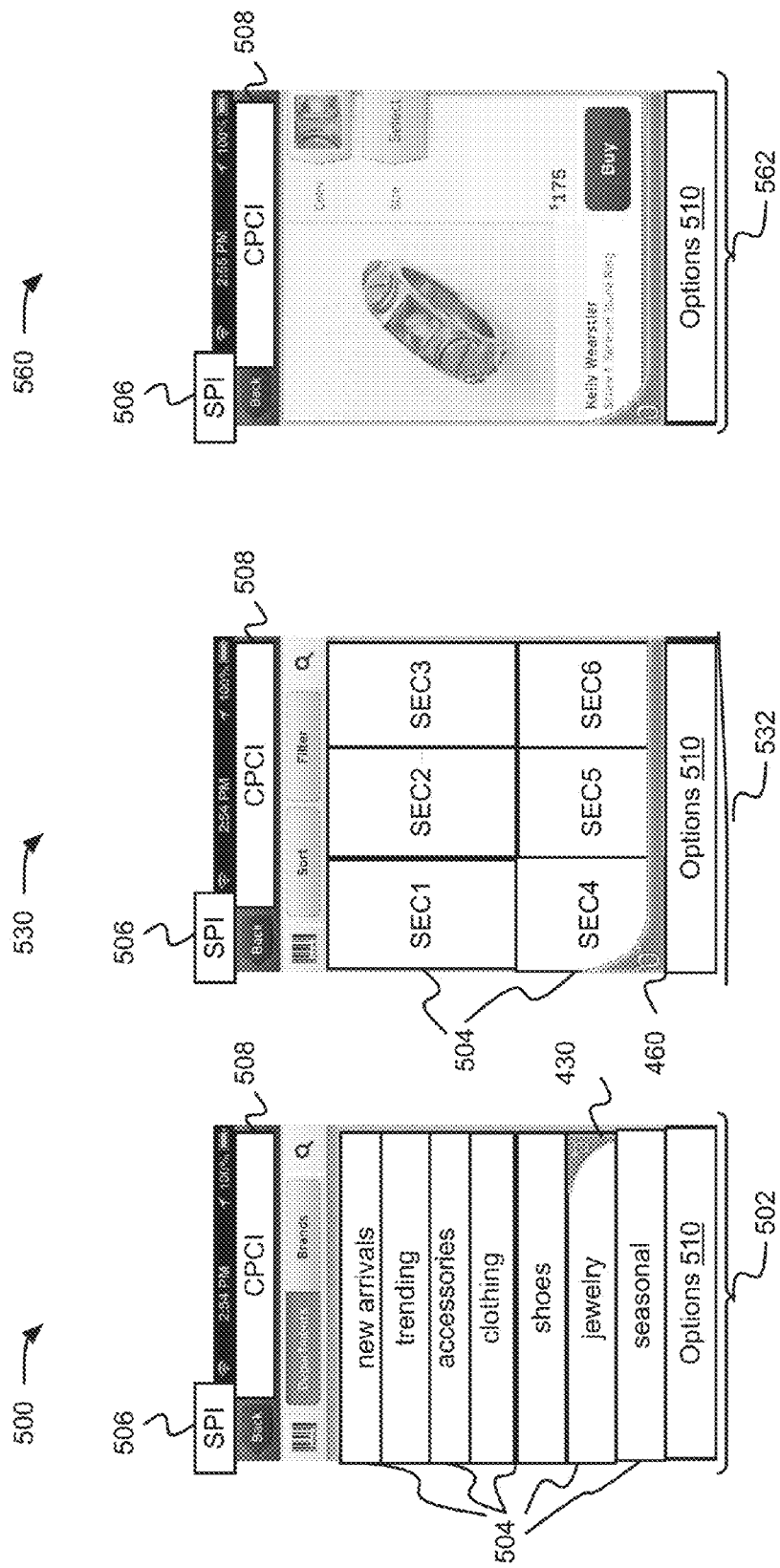

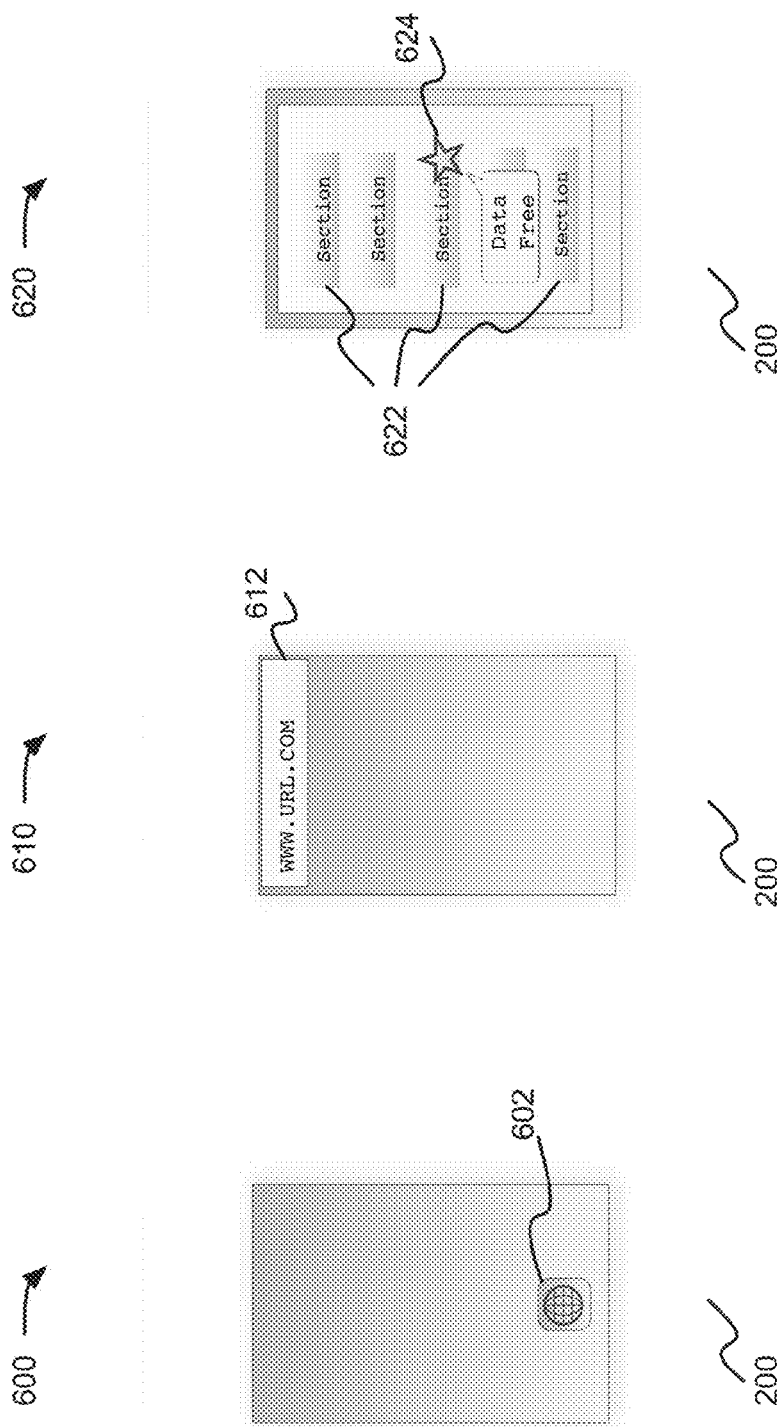

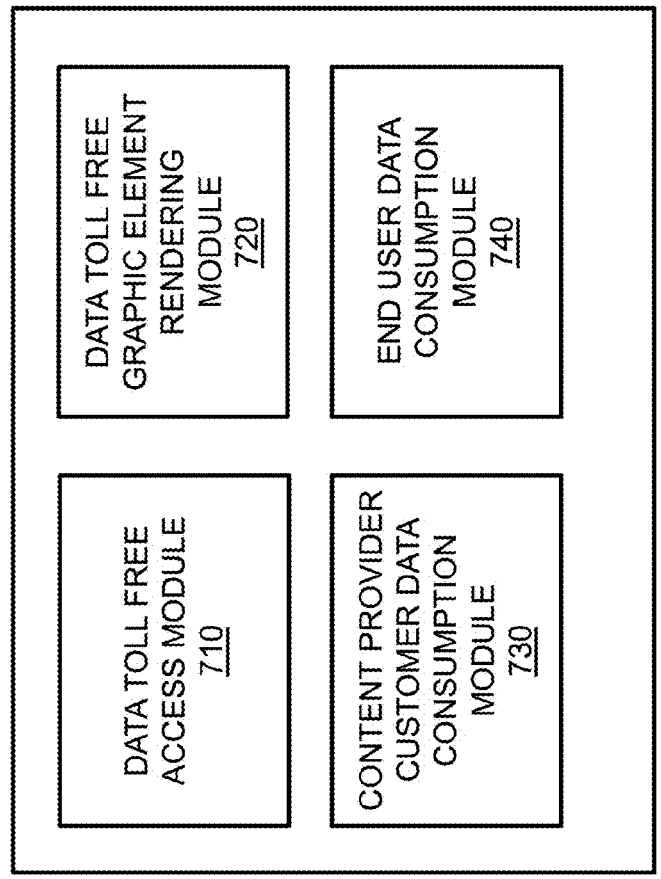

DATA TOLL SUBSIDY MANAGEMENT

CROSS REFERENCE TO RELATED APPLICATIONS

This application is a continuation of U.S. patent application Ser. No. 13/934,324 filed on Jul. 3, 2013, the disclosure of which is hereby incorporated herein by reference in its entirety.

BACKGROUND INFORMATION

Computing devices sometimes include a graphical user interface (GUI) that is used to present applications and content (e.g., web pages, multimedia content, etc.) to users. The computing devices may be used to access content on a network associated with a service provider. The content may be provided by a third party content provider. When the end user accesses content or applications, the associated data usage is identified by the service provider.

Data usage for end users is typically charged to an end user account associated with the end user. The end user account may have a periodic limit on total data usage, for example on wireless networks (e.g., a 1 Gigabit per month data plan). End users on networks that have periodic limits for data usage often arrange their data usage behavior to avoid overages associated with periodic limits on data usage. For example, an end user may curtail online shopping or other activity when they are approaching or have exceeded the periodic limit.

BRIEF DESCRIPTION OF THE DRAWINGS

FIG. 3 illustrates exemplary components of one or more of the devices included in the environment of FIG. 1;

FIGS. 4A-4C illustrate exemplary embodiments of graphic elements that indicate data toll free content or applications;

FIGS. 5A-5C illustrate exemplary embodiments of a content provider customer end user interface with graphic elements positioned to indicate data charge free components;

FIGS. 6A-6F illustrate end user navigation of a data toll free website associated with a content provider customer;

FIG. 7 is a diagram of exemplary functional components of the user data toll free management server of FIG. 1;

DETAILED DESCRIPTION OF PREFERRED EMBODIMENTS

The following detailed description refers to the accompanying drawings. The same reference numbers in different drawings may identify the same or similar elements. Also, the following detailed description is exemplary and explanatory only and is not restrictive of the invention, as claimed.

Embodiments described herein relate to devices, methods, and systems for identifying data consumption by a user device associated with particular content and assigning billing for the data consumption to a content provider for the content. The user device may be associated with a particular end user. The systems and methods allow end users to use data with no charges for content associated with particular content providers. The content provider may pay data charges for end users (e.g., consumers or prospective customers) that visit their websites or use their applications. Consistent with embodiments, different models of data toll free content (or applications) may be applied to websites on mobile phones and applications on mobile phones to allow content providers to subsidize end user's use of data in conjunction with content provided by the content provider.

In addition, embodiments described herein relate to devices, methods, and systems for providing consistent graphic elements (i.e., visual signifiers) to make clear to end users that particular content is toll free. The graphic elements may provide forewarning that the end user is entering a toll free zone. Consistent with embodiments, data usage charge shifting may be applied for web pages, videos images, audio files or channels of content provided by a company.

Figure 1:
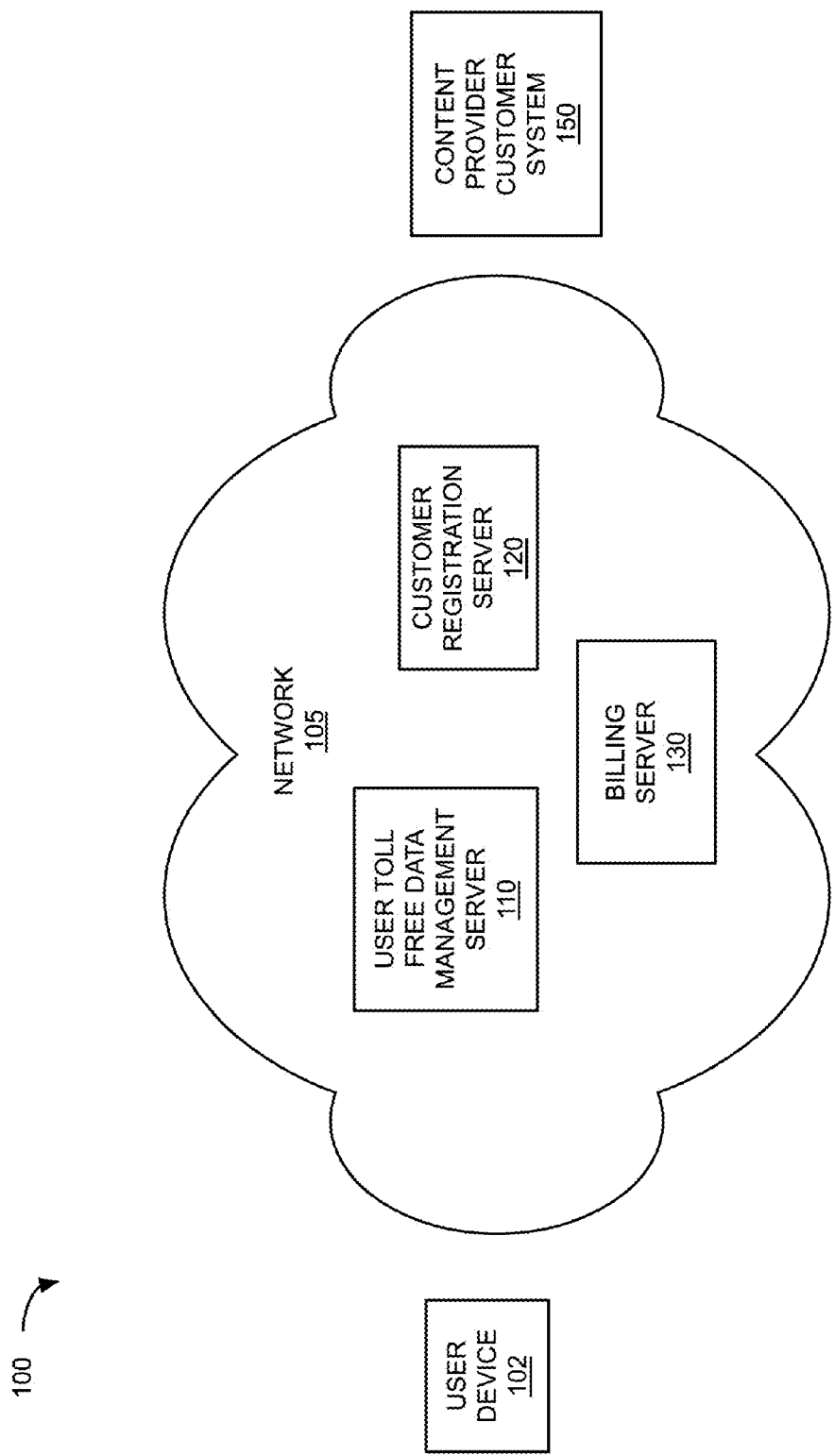
FIG. 1 is a diagram illustrating an exemplary environment according to an implementation described herein.

FIG. 1 is a block diagram of an exemplary environment 100 in which systems and methods described herein may be implemented. Environment 100 may include a user device 102, a network 105 and a content provider customer system 150. In an exemplary implementation, network 105 may represent a network associated with a service provider that provides various services, such as Internet-protocol (IP) related services, value added services, etc. For example, in one implementation, network 105 may represent an Internet-protocol Multimedia Subsystem (IMS) network that provides services to IMS subscribers (referred to herein as subscribers). The exemplary configuration illustrated in FIG. 1 is provided for simplicity. It should be understood that a typical environment may include more or fewer components than illustrated in FIG. 1. For example, although a single user device 102 and a single content provider customer system 150 is shown, environment 100 may include large numbers of user devices 102 (e.g., thousands or millions of user devices 102) and content provider customer systems 150 (e.g., hundreds or thousands of content provider customer systems 150). Additionally, environment 100 may include a number of other networks.

User device 102 (referred to singularly as user device 102, in plural as user devices 102 or generally as user devices 102) may include any type of device that is able to transmit and receive data, such as text data, video data, image data, audio data, multi-media data, etc. For example, user devices 102 may include some type of computer, such as a personal computer (PC), a tablet computer, a laptop computer, etc., a personal digital assistant (PDA), a web-based appliance, a mobile terminal (e.g., a cellular telephone), etc. User devices 102 may also include a telephone, such as an Internet-protocol (IP) based phone, a wireless telephone, etc., used to make and receive telephone calls. User device 102 may be a subscriber to telephony services and/or data usage services provided in association with network 105. Data usage services may include any activity that consumes data and may be implemented, for example, in conjunction with or as a consequence of, user device 102 sending or receiving data from accessing websites, applications, etc. Each user device 102 may be associated with one or more particular customer accounts for end user customers of the service provider that operates network 105.

Network 105 may include one or more wired, wireless and/or optical networks that are capable of receiving and transmitting data, voice and/or video signals, including multi-media signals that may include voice, data and video information. For example, network 105 may include one or more public switched telephone networks (PSTNs) or other type of switched network. Network 105 may also include one or more wireless networks and may include a number of transmission towers for receiving wireless signals and forwarding the wireless signals toward the intended destinations. Network 105 may further include one or more satellite networks, one or more packet switched networks, such as an IP-based network, a local area network (LAN), a wide area network (WAN), a personal area network (PAN) (e.g., a wireless PAN), a wireless local area network (WLAN), an intranet, the Internet, or another type of network that is capable of transmitting data.

Network 105 may provide data usage services to user devices 102 that send and/or receive data via network 105. Network 105 may also provide services to content provider customers. Content provider customers may include third party entities that provide content or applications that end users may access on user devices 102 via network 105. For example, content provider customers may include any website owner/operator that may sign up to provide data to their end users, such as governments, businesses, educational organizations, service organizations, charities, churches, etc., that operate websites (e.g., department stores, online news services, music websites, etc.) or applications (e.g., streaming video services, weather alerts, etc.) offered to end users. Network 105 may include devices that facilitate data usage by end users in association with content provided by content provider customers. These devices may include a user data toll free management server 110, a content provider customer registration server 120, and a billing server 130.

User data toll free management server 110 may be a network device or server (or application server, group of servers, etc.), which allows end users to use data with no charges for content associated with particular content provider customers via network 105 (i.e., the content is data toll free from the user's perspective), such as described with respect to FIG. 7 hereinbelow. User data toll free management server 110 may allow tracking of data usage in association with content consumption by end users at/in association with particular content provider customers. User data toll free management server 110 may provide information to billing server 130 that allows content provider customers to pay for consumers (i.e., end users associated with user devices 102) to look at their websites or use their applications.

Content provider customer registration server 120 may be a network device or server (or application server, group of servers, etc.) which allows a content provider customer to register data toll incurring portions (or data consuming portions) of associated applications or websites with a service provider for network 105, such as described with respect to FIG. 9 hereinbelow. For example, a content provider customer may register content at a particular Uniform resource locator (URL) or an application identifier (ID) for a particular application. Content provider customer registration server 120 may provide a content provider customer based portal where a content provider customer (e.g., a third party company) may create an account (or identify an existing account with the service provider), register and add their application or specific page to a database of identifiers for data toll free components. The content provider customer may apply specific classes to items they want to make data toll free for end users.

Billing server 130 may manage charging users for services provided via network 105. Billing server 130 may include, for example, a payment processing component, a billing component, and/or a settlement component. In some implementations, billing services may be performed by servers external to network 105 (e.g., billing servers for a partner entity or third party entity). Billing server 130 may receive instructions and/or information from user data toll free management server 110 indicating an account, associated with a content provider customer, to which charges for data consumed by an end user are to be applied.

Content provider customer system 150 may collect, generate, and provide data consuming content that may be accessed by subscribers of network 105 via user devices 102. Data consuming content may include, for example, web pages, applications, encoded video content in any of a variety of formats, including, for example, Multiview Video Coding (MVC), Moving Picture Experts Group (MPEG)-2 TS, etc. Content provider customer system 150 may provide media content to customer premises network 110. Additionally, content provider customer system 150 may interface with content provider customer registration server 120 to register items that the content provider customer wants to make data toll free for end users.

It should be understood that network 105 may include additional elements that aid in routing calls and providing services to customers. In addition, functions described as being performed by one of the elements in FIG. 1 may alternatively be performed by another element or multiple elements. In addition, although the various devices illustrated in FIG. 1 are shown as separate devices, in other implementations, the functions performed by two or more of these devices may be performed by a single device or platform. Still further, additional connections (not shown) between the components of FIG. 1 may exist. Network 105 may also include additional elements, such as switches, routers, gateways, backend systems, etc., that aid in routing calls and/or session information in network 105 and providing services to parties associated with user devices 102.

Figure 2:
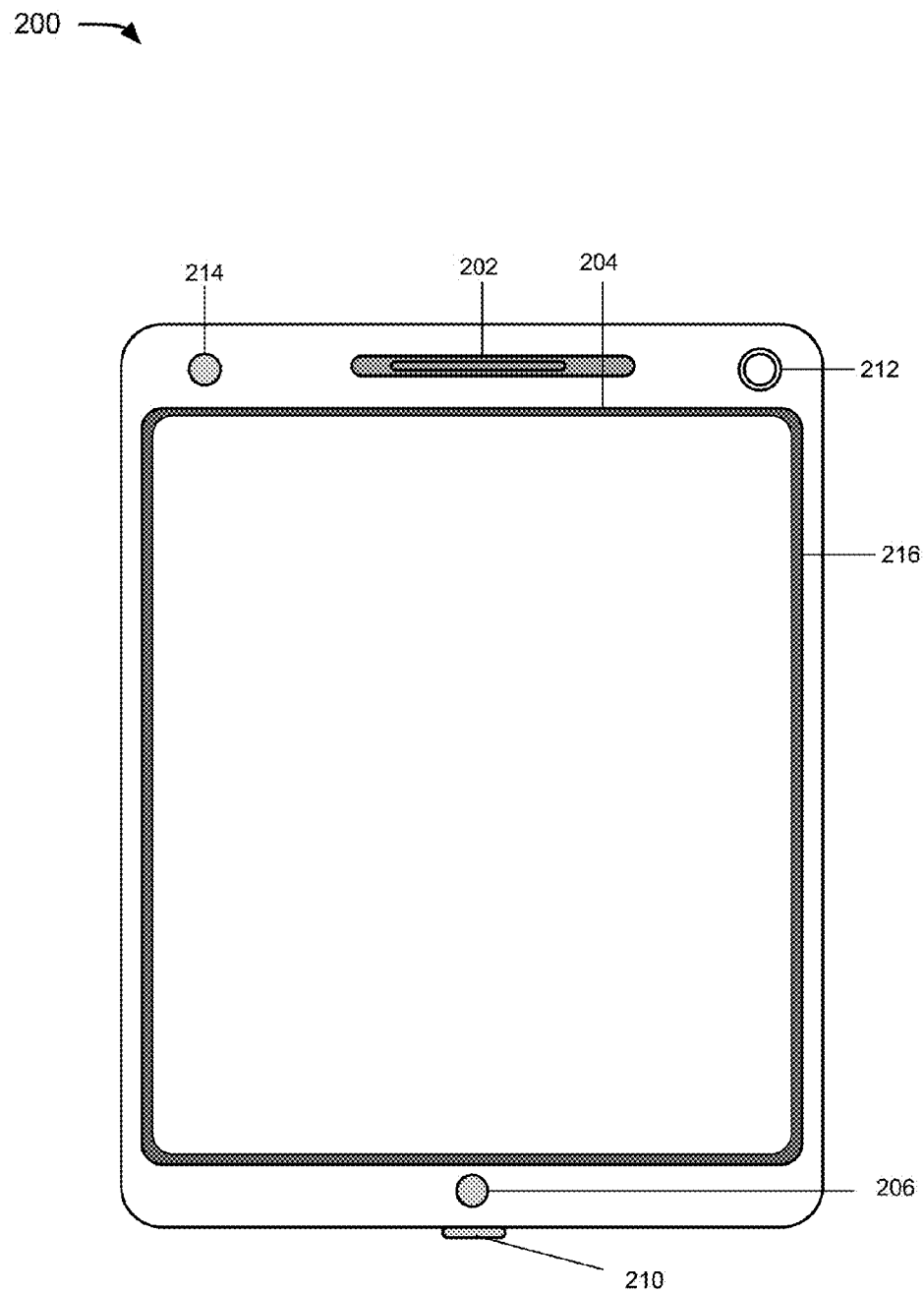
FIG. 2 is a diagram of an exemplary device in which methods and systems described herein may be implemented.

FIG. 2 is a diagram of an exemplary device 200 in which methods and systems described herein may be implemented. Although illustrated as a tablet or touch screen device, device 200 may include any of the following devices: an electronic notepad, a tablet computer, a laptop, and/or a personal computer; a personal digital assistant (PDA) that can include a telephone; a mobile telephone; a cellular phone; a gaming device or console; a peripheral (e.g., wireless headphone); a digital camera; or another type of computational or communication device.

In this implementation, device 200 may take the form of a tablet computer. As shown in FIG. 2, device 200 may include a speaker 202, a touchscreen display 204, control button 206, a microphone 210, sensors 212, a front camera 214, and a housing 216. Speaker 202 may provide audible information to a user of device 200. Although device 200 is shown with particular components and a particular configuration, device 200 may include fewer, more or different components, such as additional sensors, input devices, and may include associated devices (e.g., a stylus) etc.

Display 204 may provide visual information to the user, such as an image of a caller, video images, or pictures. In addition, display 204 may include a touchscreen for providing input to device 200. Display 204 may provide hardware/software to detect the coordinates of an area that is touched by a user. For example, display 204 may include a display panel, such as a liquid crystal display (LCD), organic light-emitting diode (OLED) display, and/or another type of display that is capable of providing images to a viewer. Display 204 may include a transparent panel/surface for locating the position of a finger or an object (e.g., stylus) when the finger/object is touching or is close to display 204.

Control button 206 may permit the user to interact with device 200 to cause device 200 to perform one or more operations, such as place or receive a telephone call, input data to device 200, manipulate user interface elements, etc. In some implementations, control buttons 206 may include a telephone keypad (not shown) or an alphanumeric keyboard. Microphone 210 may receive audible information from the user. Sensors 212 may collect and provide, to device 200, information (e.g., acoustic, infrared, etc.) that is used to aid the user in capturing images or in providing other types of information (e.g., a distance between a user and device 200). Front camera 214 may enable a user to view, capture and store images (e.g., pictures, video clips) of a subject in front of device 200. Housing 216 may provide a casing for components of device 200 and may protect the components from outside elements.

FIG. 3 is a diagram of example components of a device 300. Each of user device 102, user data toll free management server 110, content provider customer registration server 120, billing server 130 or content provider customer system 150 may include one or more devices 300. As shown in FIG. 3, device 300 may include a bus 310, a processor 320, a memory 330, an input device 340, an output device 350, and a communication interface 360.

Bus 310 may permit communication among the components of device 300. Processing unit 320 may include one or more processors or microprocessors that interpret and execute instructions. In other implementations, processing unit 320 may be implemented as or include one or more application specific integrated circuits (ASICs), field programmable gate arrays (FPGAs), or the like.

Memory 330 may include a random access memory (RAM) or another type of dynamic storage device that stores information and instructions for execution by processing unit 320, a read only memory (ROM) or another type of static storage device that stores static information and instructions for the processing unit 320, and/or some other type of magnetic or optical recording medium and its corresponding drive for storing information and/or instructions.

Input device 340 may include a device that permits an operator to input information to device 300, such as a keyboard, a keypad, a mouse, a pen, a microphone, one or more biometric mechanisms, and the like. Output device 350 may include a device that outputs information to the operator, such as a display, a speaker, etc.

Communication interface 360 may include a transceiver that enables device 300 to communicate with other devices and/or systems. For example, communication interface 360 may include mechanisms for communicating with other devices, such as other devices of system 100.

As described herein, device 300 may perform certain operations in response to processing unit 320 executing software instructions contained in a computer-readable medium, such as memory 330. A computer-readable medium may be defined as a non-transitory memory device. A memory device may include space within a single physical memory device or spread across multiple physical memory devices. The software instructions may be read into memory 330 from another computer-readable medium or from another device via communication interface 360. The software instructions contained in memory 330 may cause processing unit 320 to perform processes described herein. Alternatively, hardwired circuitry may be used in place of or in combination with software instructions to implement processes described herein. Thus, implementations described herein are not limited to any specific combination of hardware circuitry and software.

Although FIG. 3 shows example components of device 300, in other implementations, device 300 may include fewer components, different components, differently arranged components, or additional components than depicted in FIG. 3. Alternatively, or additionally, one or more components of device 300 may perform one or more other tasks described as being performed by one or more other components of device 300.

FIGS. 4A-4C illustrate exemplary embodiments of data toll free graphic elements 400, 430 and 460, respectively, that indicate data toll free items. Although (data toll free) graphic elements 400, 430 and 460 are shown with particular configurations, the configurations shown in FIGS. 4A-4C are for illustrative purposes. Other configurations may be implemented. For example, graphic elements 400, 430 and 460 may have different shapes, colors, and properties and produce different corresponding effects than those depicted in FIGS. 4A-4C.

The graphic elements (400, 430 and 460) may indicate that a customer may click on links, or icons associated therewith, to access content that is (or will be) billed to the content provider customer (e.g., a proprietor for the website that the end user visits) and not to the end user. From the end user's perspective, the content is data toll free. Graphic elements 400, 430 and 460 may have common attributes (or patterns) that allow a user to recognize that the graphic element is a visual signifier for data toll free content or applications. For example, all graphic elements may have a common color (and, in some instances shade of the common color). In a particular example, green bars or other graphic elements may indicate that the data toll free items are not being charged against a data plan for the end user. Graphic elements 400, 430 and 460 may be implemented to provide data toll free indication in a directly applicable to data toll free items, easy to use application.

As shown in FIG. 4A, a (general) data toll free service symbol 400 may indicate data toll free wireless content. Data toll free service symbol 400 may provide a direct association with data toll free items (e.g., content or applications) that conveniently identifies data toll free items to companies, and consumers. Data toll free service symbol 400 may be implemented as a lightweight graphic element overlaid on a particular portion of a web page or other user interface. Data toll free service symbol 400 may be used as a general indicator of data toll free status.

FIG. 4B depicts a data toll free notification corner 430. Data toll free notification corner 430 may be arranged on top (e.g., a visual effect of floating on top of) the content item to indicate upcoming data free content. Links or icons for a website that are treated with data toll free notification corner 430 may lead to data toll free web pages when selected by the end user. In some embodiments, data toll free notification corner 430 may identify a section of a website that is data toll free. May be applied by the service provider on a per item basis (e.g., specifically identified items) or based on classes of items (e.g., all jewelry links identified by metadata on a department store website).

Data toll free notification corner 430 may provide a clearly defined indicator of a data toll free zone among data toll items (i.e., content that will incur a data usage charge to the end user if selected or clicked on) on a website. Data toll free notification corner 430 may include all or a portion of general data toll free service symbol 400. Data toll free notification corner 430 may provide an ability to differentiate between links that are data toll free and links that are not data toll free or not (directly or indirectly via the service provider) controlled by the content provider customer (e.g., outside links).

FIG. 4C depicts a data toll free notification bar 460. Data toll free notification bar 460 may include all or a portion of general data toll free service symbol 400. Data toll free notification bar 460 may float on top of the data toll free content. Data toll free notification bar 460 may indicate aggregated data toll free content (e.g., an entire web page that contains multiple links that are data toll free). Data toll free notification bar 460 may be applied to the aggregated data toll free content to indicate that the aggregated data toll free content is data toll free. Data toll free notification bar 460 may be positioned in a manner that indicates that an entire web page or a section that includes multiple links is data toll free. Data toll free notification bar 460 may include an appropriate message indicating the data toll free status of the section. In some instances, data toll free notification bar 460 may be provided in conjunction with a video and/or audio message (e.g., "welcome to our data toll free website, feel free to browse . . . the data is on us!").

According to one implementation, data toll free graphic elements (e.g., 400, 430 or 460) may be applied to provide an indication of data toll free status for an application. Applications have different patterns in which instances notification of data toll free status may require that a notification scheme be designed based on a specific application of class of applications. A common motif that includes general data toll free service symbol 400 may be applied in instances in which data toll free status is applied to applications. For example, a data toll free notification (e.g., any of graphic elements 400, 430, or 460) may be positioned in a section of the user interface (or provided) to provide notification in association with applications currently running on user device 102. The data toll free notification may be positioned in conjunction with an icon that represents the particular application on an application selection screen of a user interface (e.g., of user device 102). Alternatively, the data toll free notification may be provided at a time that an application is accessed or the end user directly requests or interfaces with the application (e.g., when the user opens an application on their user device 102).

The service provider may retain control (and, in some instances, contractual right of control) of graphic elements. In instances in which the content provider customer account is suspended, the service provider may quickly disable visual and other elements, including the graphic elements (400, 430, and 460) to control in real time (i.e., "on the fly") data toll free allocation so that the end user is not incorrectly notified that the content provider customer will pay for data usage by the end user. Content provider customer may not have direct control over data toll free notification tools, such as graphics, audio or visual elements. In some instances, data toll free notification tools, including graphic elements and audio may require integration (or may be integrated) with an operating system of a user device 102.

FIGS. 5A-5C illustrate exemplary embodiments 500, 530 and 560 of content provider customer end user interfaces (502, 532 and 562 respectively) with graphic elements positioned to indicate data charge free components. Although embodiments 500, 530 and 560 are shown with particular configurations, the configurations shown in FIGS. 5A-5C are for illustrative purposes. Other configurations may be implemented.

Each of content provider customer end user interfaces 502, 532 and 562 may represent a user interface provided by the content provider customer that includes data consuming items (i.e., items that require data usage to transfer or receive). A content provider customer end user interface may include a web page, a specialized application interface (i.e., a navigation application, a running application, etc.), or other user interface in which links to data consuming items may be displayed.

FIG. 5A illustrates content provider customer end user interface 502 which may be web page that includes different sections 504 displayed on a user device 102. A service provider indicator (SPI) 506 (e.g., a company name for the service provider that provides network services in association with network 105), a content provider customer indicator (CPCI) 508 (e.g., a company name for the content provider), and an options menu 510 (e.g., a menu of control options for the website based on functionality for the content items, such as a new content items option for a shopping website, shopping cart, etc.) may be displayed on the customer end user interface. Each section 504 may correspond to a link at which content may be accessed. The user device 102 may send and/or receive data and an end user data usage account associated with the user device 102 may incur charges if the user selects any of the sections 504. However, graphic element 430 is applied to a particular section 504 (jewelry in FIG. 5A), indicating that a customer that is browsing the content provider website on user device 102 may click through to access content without incurring a data charge.

FIG. 5B illustrates content provider customer end user interface 532 which may be content provider web page that includes different sections 504 (shown as sec1 to sec 6) displayed on a user device 102. In this instance a data toll free notification bar 460 may be positioned along a portion of content provider customer end user interface 532 to indicate that all items on the web page are data free to the end user.

FIG. 5C illustrates content provider customer end user interface 562 which may be web page that includes a single section. A data toll free notification bar 460 may be used to indicate that a current web page or streaming media is data free.

FIGS. 6A-6E illustrate end user navigation of a data toll free website associated with a content provider customer. The end user may navigate the website on a device such as device 200, described above with respect to FIG. 2.

As shown in FIG. 6A, the end user may launch a browser on device 200 (i.e., user device 102), for example by selecting a browser icon 602 in the user interface of device 200. According to one example, the user may launch a data toll free application that provides access to content that is partially or fully data toll free to the end user.

According to one embodiment, device 200 may receive data services from the service provider via multiple different networks, which may include a data toll network and a data flat fee network. The data toll network may be a network for which data usage charges are applied and is billed on a per usage basis. The data flat fee network may be a network, such as a WLAN, for which data is not charged to the end user on a per usage basis, i.e., the amount of data usage is not tolled, but on a flat fee basis (e.g., a monthly fee for predetermined data transmissions speeds). However, the data flat fee network may have other limits, such as a limit to transmission speeds. In other embodiments, the alternative network may include a different network for which the end user is not charged (i.e., a no fee network).

As shown in FIG. 6B the browser may provide a command line 612 in which a URL for a particular content provider website associated with a content provider customer may be entered. The end user may type the website URL in the command line 612 and send a request for the particular website (e.g., by selecting enter or send, etc.).

As shown in FIG. 6C, (a page, or pages from) the content provider website may be received at device 200. One of the sections 504 may be indicated as data toll free by a data toll free notification corner 430 positioned to indicate that the section 504 is data toll free.

Figures 6D, 6E, 6F:
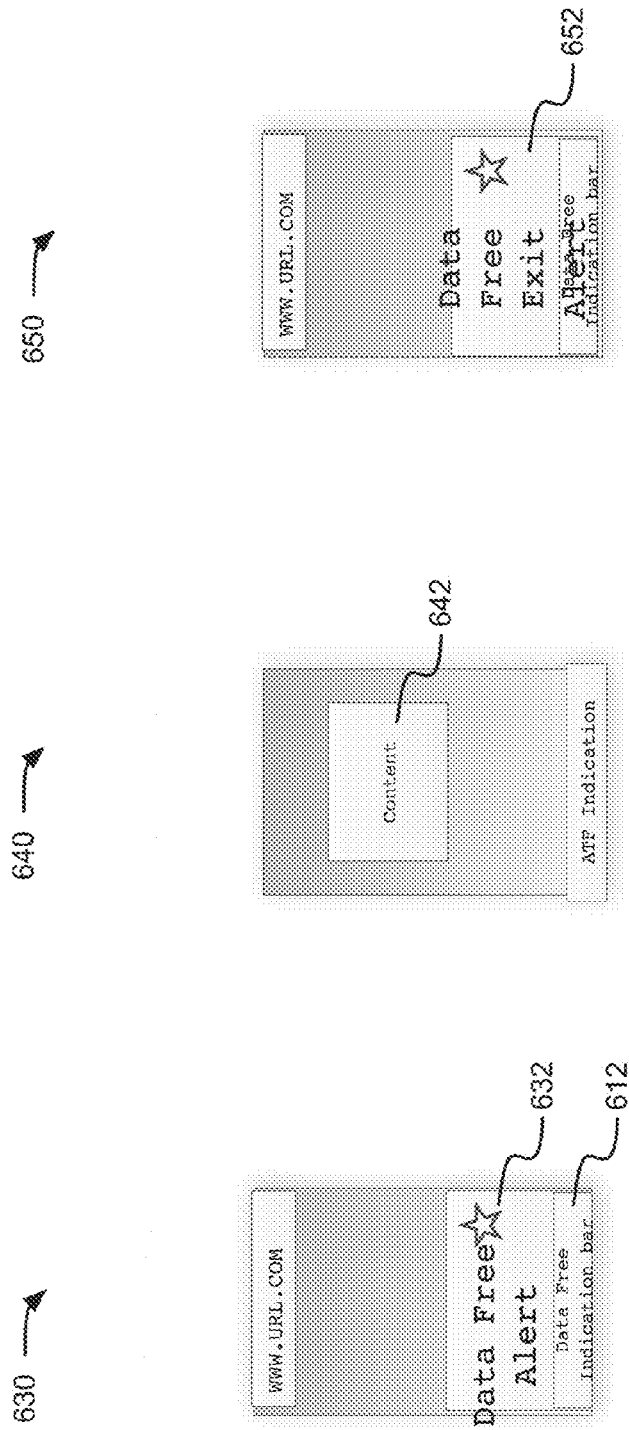

As shown in FIG. 6D the user device may display a data toll free alert 632 (i.e., a free data alert message) in instances in which the user selects to browse data toll free content. Data toll free alert 632 may be displayed for a predetermined time (e.g., a set amount of seconds) and for a set amount of times (e.g., 3 times). Data toll free alert 632 may provide a highly visible (e.g., data toll free alert may be in the center of user interface, may blink, gyrate, etc.) notification that the user is now receiving data usage courtesy of the content provider customer.

According to one embodiment, the end user may provide instructions to have non data toll free items excluded from items that are displayed at the user device 102. The service provider may allow the end user to select to receive and display only the data toll free content.

As shown in FIG. 6E, the end user may browse data toll free content 642. Data usage incurred while browsing the data toll free content 642 may be measured and the measured usage may be stored/recorded in an account associated with the content provider customer (i.e., a content provider customer account maintained by the service provider). The service provider may bill the content provider customer for data usage associated with the end user accessing the content provider customer's website.

As shown in FIG. 6F, when the user chooses to end browsing of the data toll free content 642 and exit the data toll free section of the content provider customer's website (or exit the content provider's website entirely) a data toll free exit alert 652 may be displayed. Data toll free exit alert 652 may be displayed for a set amount of seconds and for a set amount of times (e.g., 3 times). In some instances the user may not receive an exit alert and may instead go directly to the requested non-data toll free content or application.

FIG. 7 is a diagram of exemplary functional components of user data toll free management server 110. In one implementation, the functions described in connection with FIG. 7 may be performed by one or more components of device 300 (FIG. 3). As shown in FIG. 7, user data toll free management server 110 may include a data toll free access module 710, a data toll free graphic element rendering module 720, a content provider data consumption module 730 and an end user data consumption module 740.

Data toll free access module 710 may determine whether the user device 102 is requesting access to content provider customer content via a data toll network. For example, data toll free access module 710 may receive a request to access particular content. Data toll free access module 710 may determine whether the user device 102 is requesting data on a data toll network or a data flat fee network, such as a WLAN in a customer premises network. If the user device 102 is requesting data to be transferred via a data toll network then data toll free access module 710 may determine whether the data being requested is associated with a content provider customer that has an existing data toll free arrangement with the service provider. If the data being requested is associated with a content provider customer that has an existing data toll free arrangement with the service provider, data toll free access module 710 may signal data toll free graphic element rendering module 720 that data toll free access is to be allowed per terms of the data toll free arrangement between the service provider and the content provider customer.

Data toll free graphic element rendering module 720 may determine where in the content and what particular graphic elements to be inserted into the content provided by the content provider customer. For example, data toll free graphic element rendering module 720 may determine graphic elements to be inserted into the website content on a web page by web page or a link by link basis. Data toll free graphic element rendering module 720 may apply different models to websites on mobile phones and applications of providing notification that content or application are data toll free for end users. For example, data toll free graphic element rendering module 720 may include an audio notification for audio applications.

Data toll free graphic element rendering module 720 may receive metadata associated with particular items where graphic elements are to be inserted based on consumer going on to the network. For example, data toll free graphic element rendering module 720 may identify a company associated with a web page via a header for the web page or other metadata. Data toll free graphic element rendering module 720 may search a database associated with each content provider customer that details the content items or classes of content items (e.g., web pages, links, etc.) that are to be data toll free to the end user. Data toll free graphic element rendering module 720 may determine that because of metadata associated with particular requested pages, a graphic element is to be applied to the requested pages, consumers are not to be billed for data usage, and the content provider is to be billed. Data toll free graphic element rendering module 720 may insert the graphic elements into the web pages at appropriate places to identify data toll free content, such as described with respect to FIGS. 5A-5C above.

Data toll free graphic element rendering module 720 may also insert graphic elements that include a forewarning that the end user is entering or exiting a data toll free zone. Alternatively, in instances in which the content provider customer partially subsidizes the data usage, data toll free graphic element rendering module 720 may indicate that the data usage associated with browsing the content is partially subsidized (e.g., the content provider customer may pay for two thirds of data usage for high data consumption content, such as video). This may provide the end user incentive to browse content while reducing the probability that the end user may abuse the data toll free usage for high data usage content. The data toll graphic elements (not shown) may indicate a particular percentage of the data usage that is to be billed to the end user or may provide a cap to the total data that the end user may use that is to be billed to the content provider customer for particular periods (or per visit).

Content provider data consumption module 730 may determine data usage associated with access to data toll free sections of websites or applications for each particular content provider. Content provider data consumption module 730 may track data usage associated with each end user that visits data toll free sections of the content provider customer's website and provide the data usage to billing server 130, which may subsequently bill the content provider customer based on a predetermined arrangement between the content provider customer and the service provider.

According to one embodiment, in instances in which the content provider customer only partially subsidizes data usage, content provider data consumption module 730 may determine a portion of the data usage to be billed to the end user and another portion to be billed to the content provider customer. Content provider data consumption module 730 may signal billing server 130 to bill data usage to the content provider customer and the end user based on predetermined and advertised (or forewarned) percentages.

End user data consumption module 740 may direct that the end user is to resume being billed fully for data usage when the end user exits the data toll free zone.

Figure 8:
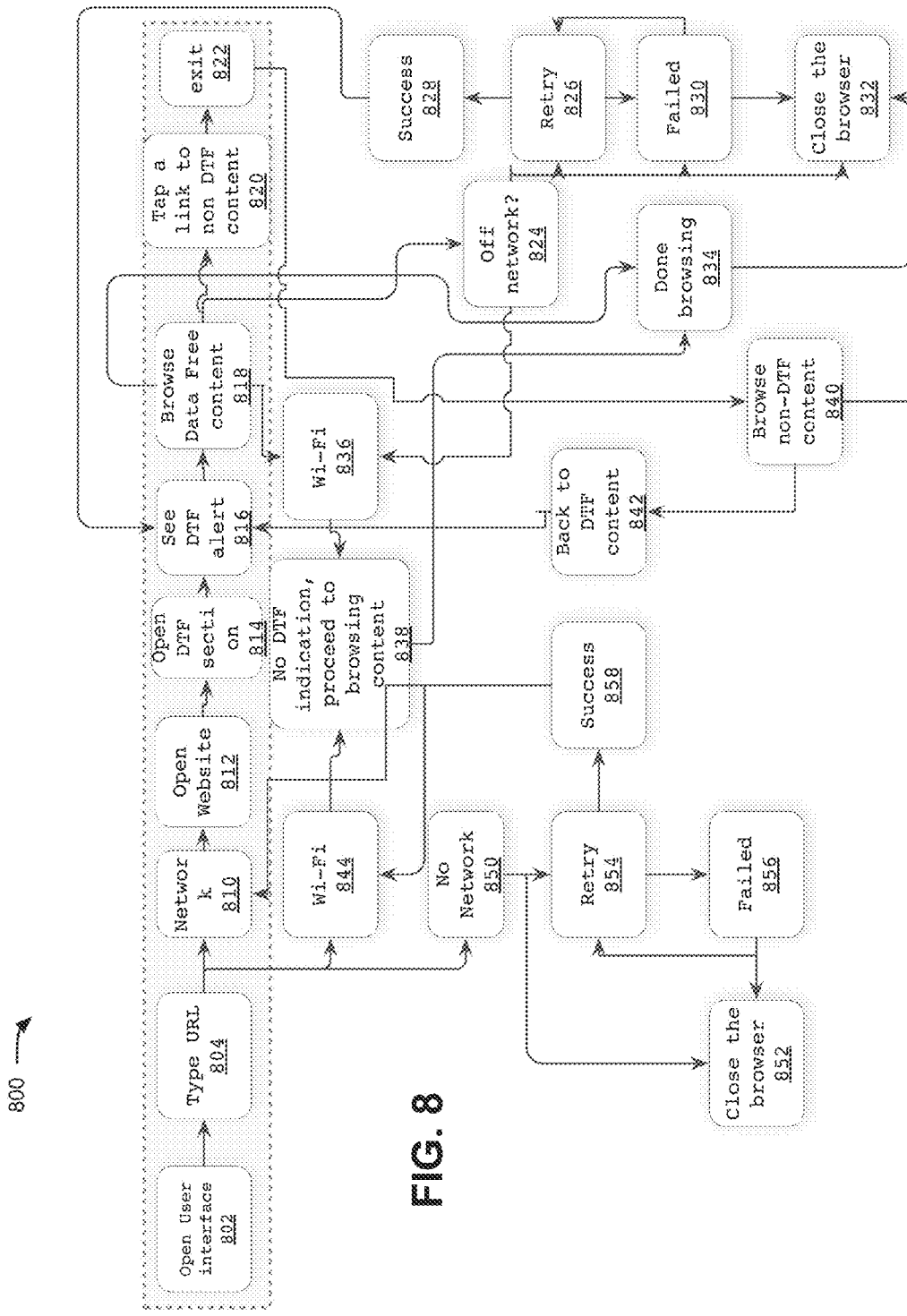
FIG. 8 is a flow diagram of a process of accessing data toll free content on the user device of FIG. 1.

FIG. 8 is a flow diagram 800 of data toll free access to a content provider customer's website on a user device associated with an end user via networks that includes a data toll network and a data flat fee network (in this instance a Wi-Fi network). Although flow diagram 800 is described with respect to content received from a content provider, principles described herewith may be applied to application received from application providers.

As shown in flow diagram 800, a user may open a user interface or sign in (e.g., a browser or an application interface) (block 802) on a device 200. The user may type an instruction to access content from a content provider, e.g., a URL into a command line of the browser on device 200. The URL may be associated with content provided by a particular content provider customer.

If the user is accessing the content via a data toll network (block 810), the device 200 may open the content provider customer's website (block 812). The end user may navigate to and open a data toll free (DTF) section (block 814). In some implementations, the user may be required to download and install an application to device 200 that enables functionality of data toll free content or applications associated with a particular (or any) content provider customer (i.e., the user may be required to use a particular data toll free application to receive free data). The data toll free section of the website may include a mixture of data toll free items and non-data toll free items (i.e., unsubsidized links) or may include only data toll free items. The user device may receive and display a DTF alert (block 816). The DTF alert may inform the user that they are currently browsing data usage charge free courtesy of the content provider. According to one embodiment, the DTF alert may be provided via built in operating system functionality of the device 200, such as pop ups, toast messages, notification bar icons, etc. According to another embodiment, in instances in which the content provider customer is subsidizing additional concurrent data usage by device 200, the DTF alert may inform the user that all their current data usage, including data usage unconnected to the content provider, is sponsored by the content provider customer. For example, the content provider may sponsor data usage connected with email download, weather updates. a stock tracker, etc. at the same time as content or application provided by the content provider.

The end user may browse DTF content (block 818). When the end user is finished browsing the DTF content, the end user may close the browser (block 834), switch to a data flat fee network, such as a Wi-Fi network, or tap a link to non DTF content (block 820). If the user taps the link to non DTF content (at block 820), the device 200 may exit (block 822) and proceed to browse non-DTF content (block 840). The user may receive no exit alert in some instances. In some instances in which the data toll free application has been previously downloaded, the device 200 may provide an exit alert. In other instances, the exit alert may be provided based on additional processes implemented by some combination of the device 200, data toll free applications downloaded to device 200, the service provider network and/or the content provider customer website (e.g., Java applets, etc.). If the user chooses to go back to DTF content (block 842), the DTF alert may be displayed (block 816).

In instances in which the end user is involuntarily disconnected from (i.e., "kicked off") the data toll network (block 824), device 200 may retry connection to the data toll network (block 826). If the retry (block at 826) is successful (block 828), the end user may receive a DTF alert (block 816) and continue browsing DTF content. However if the retry fails (block 830), the device 200 may retry again (block 826) or close the browser (block 832).

If the user is accessing the content via a data flat fee network (e.g., a WLAN (Wi-Fi) network) (block 844), the device 200 may provide a "no DFT" indication in some instances in which the data toll free application has been previously downloaded (or may not provide any indication at all) and the end user may proceed to browsing content (block 838). In other words, the data toll free management is not invoked if the end user is not on a data tolled network (e.g., if the end user is on a Wi-Fi network there is no data toll free treatment because the end user is using Wi-Fi data and not usage tolled data, such as mobile data). The end user may set device 200 to select a data flat fee network (or a no charge network) when available.

If no network is available (block 850), device 200 may close the browser (block 852) or automatically retry (block 854) until the device successfully (block 858) connects to the network (at 810). If retries (at block 854) fail (block 856) (e.g., after a predetermined number of retries to connect to the data toll network), the device 200 may close the browser (block 852) or provide a message indicating that there are no networks available.

Figure 9:
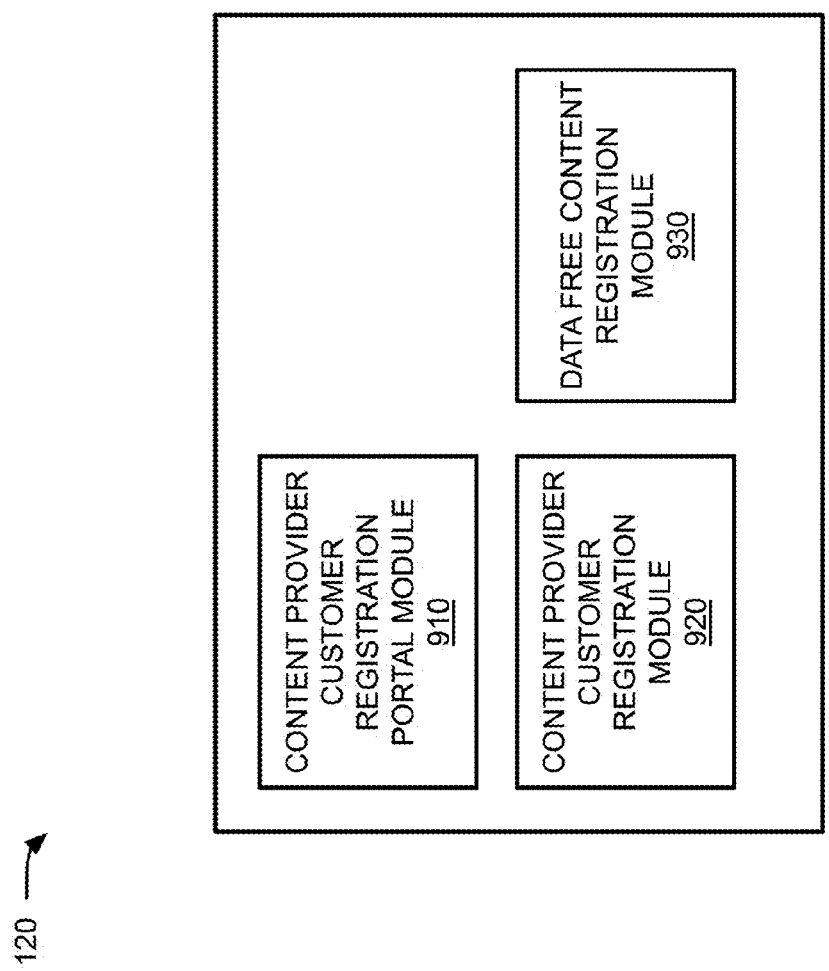
FIG. 9 is a diagram of exemplary functional components of the content provider customer registration server of FIG. 1.

FIG. 9 is a diagram of exemplary functional components of the content provider customer registration server 120 of FIG. 1. In one implementation, the functions described in connection with FIG. 9 may be performed by one or more components of device 300 (FIG. 3). As shown in FIG. 9, content provider customer registration server 120 may include a content provider customer registration portal module 910, a content provider customer registration module 920, and a data toll free content registration module 930.

Content provider customer registration portal module 910 may provide a customer based portal where a content provider customer may create an account and register to provide data toll free content to end users. The customer based portal may be a specialized portal that provides functionality for the content provider customer to register both their company as a data toll free content provider and particular items that the content provider customer intends to make data toll free to end users. The content provider customer may link to an existing account (e.g., a corporate account) for the content provider customer.

According to another embodiment, content provider customer registration portal module 910 may provide a demonstration ("demo") of the content provider customer's website including the graphic elements. Content provider customer registration portal module 910 may allow the content provider customer to view different alignments of the graphic elements prior to "live" implementation. For example, the graphic elements may be aligned to the top, instead of the bottom of the user interface or particular content link. The alternative alignments may still be consistent with (or similar to) a first pattern (and color) of graphic elements.

According to an embodiment, content provider customer registration portal module 910 may provide a simulation of billing based on current website traffic and different alignments of graphic elements. For example, the content provider customer may be provided an estimate of billing based on application of graphic elements to different sections of the content provider customer's website.

Content provider customer registration module 920 may receive registration information (e.g., via the customer based portal) from the content provider customer. The registration information may include information identifying the company (e.g., a name, contact information, physical and virtual addresses, etc.). Content provider customer registration module 920 may store the registration information in a format and a database accessible by user data toll free management server 110.

Data toll free content registration module 930 may allow the content provider customer (e.g., via the customer based portal) to add an application or specific page and apply specific classes to the items they want to make data toll free. Data toll free content registration module 930 may content provider may provide instructions to the content provider customer that control over graphics elements is retained by the service provider.

Data toll free content registration module 930 may allow the content provider customer to submit requests to apply data toll free treatment while the service provider applies the data toll free treatment to items identified by the content provider customer. Data toll free treatment may include identifying an item as data toll free in a database maintained by the service provider, storing metadata that identifies the item or class of items, providing an indication of the data toll free status of the item and billing data usage, by end users, associated with accessing the data toll free items to an account associated with the content provider customer.

Figure 10:
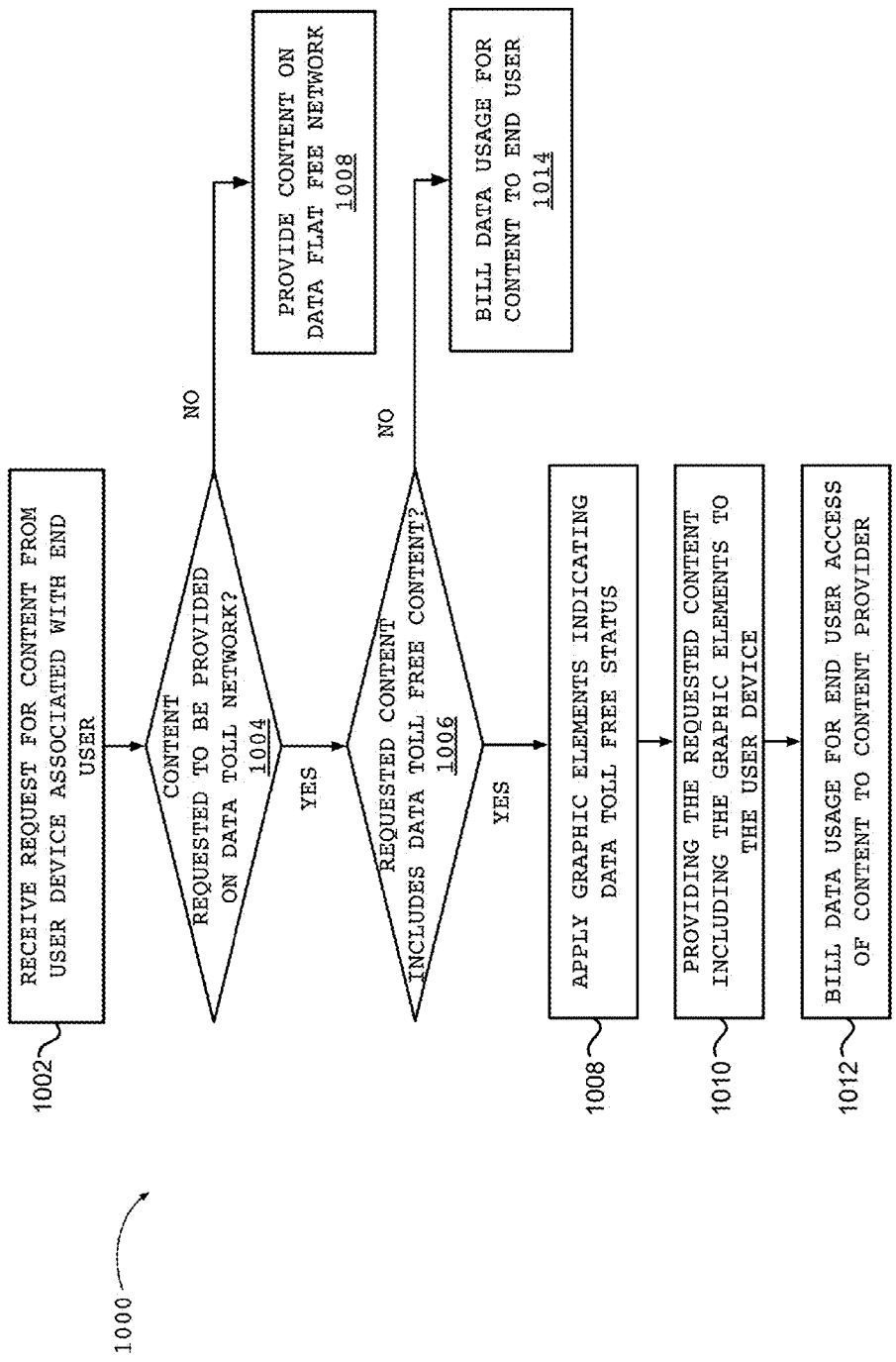
FIG. 10 is a flowchart of an exemplary process for providing data charge free services to a user device.

FIG. 10 is a flowchart of an exemplary process for providing data charge free services to a user device. Process 1000 may execute in user data toll free management server 110. In another implementation, some or all of process 1000 may be performed by another device or group of devices, including or excluding user data toll free management server 110. It should be apparent that the process discussed below with respect to FIG. 10 represents a generalized illustration and that blocks/steps may be added or existing blocks/steps may be removed, modified or rearranged without departing from the scope of process 1000.

At block 1002, user data toll free management server 110 may receive a request for content, which is to be provided by a content provider, from a user device 102. For example, user data toll free management server 110 may receive request to provide content from a particular URL from user device 102.

User data toll free management server 110 may determine whether the user device 102 that is requesting the content is requesting the content be provided on a data toll network (block 1004). For example, user data toll free management server 110 may determine a network via which the request was received.

If the requested content is to be provided on (via) a data toll network (block 1004—yes), user data toll free management server 110 may determine whether the requested content includes data toll free content (block 1006). For example, user data toll free management server 110 may determine whether the requested content is in a database of data toll free content. However, if requested content is not to be provided on a data toll network (block 1004—no), the requested content may be provided on a data flat fee network for which the end user is not billed on a per usage basis (e.g., a Wi-Fi network) (block 1008).

If the requested content includes data toll free content (block 1006—yes), user data toll free management server 110 may apply graphic elements indicating data toll free status to the requested content (block 1008). In one example, user data toll free management server 110 may identify particular sections of the requested content to which data toll free status applies. User data toll free management server 110 may then apply the graphic elements to the particular sections of the requested content.

User data toll free management server 110 may provide the requested content including the applied graphic elements to the user device 102 (block 1010).

At block 1012, user data toll free management server 110 may signal to billing server 130 that the content provider customer is to be billed for the user device 102 access to the particular sections of the requested content.

If the requested content is not found in the database of data toll free content (block 1006—no), user data toll free management server 110 may provide an indication that data usage associated with accessing the requested content is to be billed to the end user (block 1014).

The foregoing description of exemplary implementations provides illustration and description, but is not intended to be exhaustive or to limit the embodiments described herein to the precise form disclosed. Modifications and variations are possible in light of the above teachings or may be acquired from practice of the embodiments. For example, while series of blocks have been described with respect to FIGS. 8 and 10, the order of the blocks may be modified in other implementations. Further, non-dependent blocks may be performed in parallel. It will be apparent that different aspects of the description provided above may be implemented in many different forms of software, firmware, and hardware in the implementations illustrated in the figures. The actual software code or specialized control hardware used to implement these aspects is not limiting of the invention. Thus, the operation and behavior of these aspects were described without reference to the specific software code—it being understood that software and control hardware can be designed to implement these aspects based on the description herein.

Further, certain portions of the invention may be implemented as a "component" that performs one or more functions. These components may include hardware, such as a processor, an ASIC, or a FPGA, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer-implemented method comprising:
   sending, from a user device associated with an end user to a user data toll free management server associated with a data provider, a request for content provided by a content provider, wherein the user data toll free management server is to determine whether the requested content is to be provided via a data toll network;
   receiving, at the user device, the requested content via a data flat fee network in response to a determination that the requested content is not to be provided via the data toll network;
   receiving, at the user device, in response to a determination by the user data toll free management server that the requested content includes data toll free content, and that the requested content is to be provided via the data toll network, the requested content including one or more graphic elements, wherein the one or more graphic elements indicate data toll free status of one or more data toll free sections of the requested content;
   displaying the one or more graphic elements concurrently with the one ore more data toll free sections to indicate that the one or more data toll free sections of the requested content is data toll free; and
   incurring data usage, associated with receiving the data toll free sections at the user device, wherein the data usage is to be billed or charged to the content provider.

2. The computer-implemented method of claim 1, wherein displaying the one or more graphic elements further comprises:
   displaying a graphic element that identifies a particular content item as data toll free.

3. The computer-implemented method of claim 1, wherein displaying the one or more graphic elements further comprises:
   displaying a graphic element that identifies that access is provided data toll free to each of a plurality of items associated with data toll free content.

4. The computer-implemented method of claim 1, further comprising:
   receiving a free data alert message that indicates that data usage associated with accessing the one or more data toll free sections is data toll free to the end user.

5. The computer-implemented method of claim 4, further comprising:
   sending a request for additional content that is not data toll free;
   displaying a message that data usage associated with accessing the additional content is not data toll free to the end user in response to a request for additional content that is not data toll free;
   accessing, by the user device, the additional content; and
   incurring data usage, associated with accessing the additional content, wherein the data usage for the additional content is billed to the end user.

6. The computer-implemented method of claim 1, further comprising:
   sending an identification of data toll free content from the user device, wherein the user device is associated with the content provider and the content provider is registered with the data provider.

7. The computer-implemented method of claim 6, wherein the content provider is registered via a customer based portal.

8. The computer-implemented method of claim 6, wherein sending the identification of data toll free content further comprises:
   sending one or more of a uniform resource locator or an application identifier.

9. The computer-implemented method of claim 6, wherein sending the identification of data toll free content further comprises:
   sending an identification of at least one of specific classes of items that is to be data toll free to the end user, in response to receiving a selection of the at least one of the specific classes of items.

10. The computer-implemented method of claim 1, further comprising:
    sending a request for an application to be provided in association with the content provider;
    receiving notification that content associated with the application is to be billed to the content provider; and
    receiving the content associated with the application.

11. The computer-implemented method of claim 1, further comprising:
    receiving a notification that the content provider is providing concurrent data toll free access for content items that are not associated with the content provider.

12. The computer-implemented method of claim 1, further comprising:
    requesting content that is to be partially subsidized; and
    receiving a graphic element that identifies the requested content as partially subsidized, wherein a portion of a toll associated with the requested content that is partially subsidized is charged to the content provider, and a remainder of the toll is charged to a user account associated with the end user.

13. A device associated with an end user, comprising:
    a memory to store a plurality of instructions; and
    a processor configured to execute instructions in the memory to:
      send, to a user data toll free management server associated with a data provider, a request for content provided by a content provider, wherein the user data toll free management server is to determine whether the requested content is to be provided via a data toll network;
      receive the requested content via a data flat fee network in response to a determination that the requested content is not to be provided via the data toll network;
      receive, in response to a determination by the user data toll free management server that the requested content includes data toll free content, and that the requested content is to be provided via the data toll network, the requested content including applied one or more graphic elements, wherein the applied one or more graphic elements indicate data toll free status of one or more data toll free sections of the requested content;
      display the applied one or more graphic elements concurrently with the one ore more data toll free sections to indicate that the one or more data toll free sections of the requested content is data toll free; and
      incur data usage, associated with receiving the data toll free sections at the device, wherein the data usage is to be charged to the content provider.

14. The device of claim 13, wherein, when displaying the applied one or more graphic elements, the processor is further configured to:

display a graphic element that identifies an aggregation of a portion of items in the requested content as data toll free.

15. The device of claim 13, wherein, when displaying the applied one or more graphic elements, the processor is further configured to:
    display a free data alert message that indicates that data usage associated with accessing the data toll free sections is data toll free to the end user.

16. The device of claim 15, wherein the processor is further configured to:
    receive a request for additional content that is not data toll free;
    display an alert message that the device is no longer receiving data toll free content; and
    display the additional content.

17. The device of claim 16, wherein the alert message is displayed for at least one of a set number of times or a predetermined period.

18. The device of claim 16, wherein the processor is further configured to:
    display an identification of data toll free content from the content provider.

19. A non-transitory, computer-readable medium including instructions to be executed by a processor in a device associated with an end user, the instructions including one or more instructions, when executed by the processor, for causing the processor to:
    send, to a user data toll free management device associated with a data provider, a request for content provided by a content provider, wherein the user data toll free management device is to determine whether the requested content is to be provided via a data toll network;
    receive the requested content via a data flat fee network in response to a determination that the requested content is not to be provided via the data toll network;
    receive, in response to a determination by the user data toll free management device that the requested content includes data toll free content, and that the requested content is to be provided via the data toll network, the requested content including applied one or more graphic elements, wherein the applied one or more graphic elements indicate data toll free status of one or more data toll free sections of the requested content;
    display the one ore more data toll free sections;
    display the applied one or more graphic elements concurrently with the one or more data toll free sections to indicate that the one or more data toll free sections of the requested content is data toll free; and
    incur data usage, associated with providing the data toll free sections to the device, wherein the data usage is to be charged to the content provider.

20. The non-transitory, computer-readable medium of claim 19, wherein the one or more instructions further includes instructions for causing the processor to:
    receive a free data alert message that indicates that data usage associated with a requested application is data toll free to the end user; and
    display the free data alert message for at least one of a set number of times or a predetermined period.

* * * * *